No. 789,947. PATENTED MAY 16, 1905.
M. A. WHEATON.
DITCHING MACHINE.
APPLICATION FILED OCT. 12, 1904.

WITNESSES:
F. C. Fliedner
J. H. Rowse

INVENTOR:
Milton A. Wheaton
By Geo. H. Strong
Atty

No. 789,947. PATENTED MAY 16, 1905.
M. A. WHEATON.
DITCHING MACHINE.
APPLICATION FILED OCT. 12, 1904.

WITNESSES: INVENTOR.
Milton A. Wheaton
By Geo. H. Strong
Atty

No. 789,947. PATENTED MAY 16, 1905.
M. A. WHEATON.
DITCHING MACHINE.
APPLICATION FILED OCT. 12, 1904.

Witnesses: Inventor,
Milton A. Wheaton
By Geo. H. Strong Atty.

No. 789,947.

Patented May 16, 1905.

UNITED STATES PATENT OFFICE.

MILTON A. WHEATON, OF SAN FRANCISCO, CALIFORNIA.

DITCHING-MACHINE.

SPECIFICATION forming part of Letters Patent No. 789,947, dated May 16, 1905.

Application filed October 12, 1904. Serial No. 228,158.

*To all whom it may concern:*

Be it known that I, MILTON A. WHEATON, a citizen of the United States, residing in the city and county of San Francisco and State of California, have invented new and useful Improvements in Ditching-Machines, of which the following is a specification.

My invention relates to an improved machine for digging ditches, trenches, and the like. Its particular object is to provide a portable machine of this character adapted to operate efficiently in swampy or marshy land and in soft or clayey or sticky soils, as well as in dry ground, and which may be propelled and operated by its own power.

The invention consists of the parts and the construction and combination of parts, as hereinafter more fully described and claimed, having reference to the accompanying drawings, in which—

A represents a suitable frame suitably mounted on the respective front steering and rear driving wheels 2 3. This frame is preferably of metal and rigidly braced to afford a substantial support for the propelling, excavating, and conveying mechanisms. It is also dropped from the front and rear axles in order to bring it and its supported part as close to the ground as is practicable.

Hinged or pivoted to the frame A at a suitable point in its length and normally resting on the frame is the platform 4, directly supporting the trenching-basket or combined excavator and container 5. As here shown, the platform is movable radially in a vertical plane about the transverse pivot-shaft 6 for the purpose of maintaining the basket at different levels.

The basket 5, which constitutes a prominent element of my invention, is characterized structurally by a series of circumferentially-arranged cutting vanes or knives disposed with their edges in vertical or nearly-vertical planes and adapted when the basket is revolved about a vertical axis and advanced horizontally or in a line transverse to that axis to slice off portions of the earth to be excavated, the loosened earth passing directly into the basket through the slots between the knives, thence to be removed by suitable conveyer means. The sides of the basket may be straight or tapered, according to the desired shape in cross-section of the ditch or trench to be dug. Preferably the basket is made in the form of an inverted hollow truncated cone for various practical reasons. The size of the basket also determines the width and depth of ditch. The knives or vanes which constitute the sides of the basket are secured at top and bottom to respective rings 7 8. The knives are arranged in cross-section with their cutting edges farther from the vertical axis of the basket than are their back edges, thus leaving a slot radial to the basket between the back edge of each knife and the front or cutting edge of the next knife following it, so that as the rotating basket travels forward each knife will cut a slice from the earth being excavated, and the earth as it is so sliced off will pass directly through said slot to the inside of the basket, to be from thence elevated and disposed of as hereinafter described. The said knives should not overlap each other laterally, so as to make it possible for the sliced-off earth to wedge between them. The under side of the bottom ring-support 8 is provided with the curved cutters 9, which coöperate with the vanes when the basket is revolved and lowered to make the initial vertical cut and thereafter to give the smooth planed-like surface to the bottom of the ditch.

Figures 1, 8:
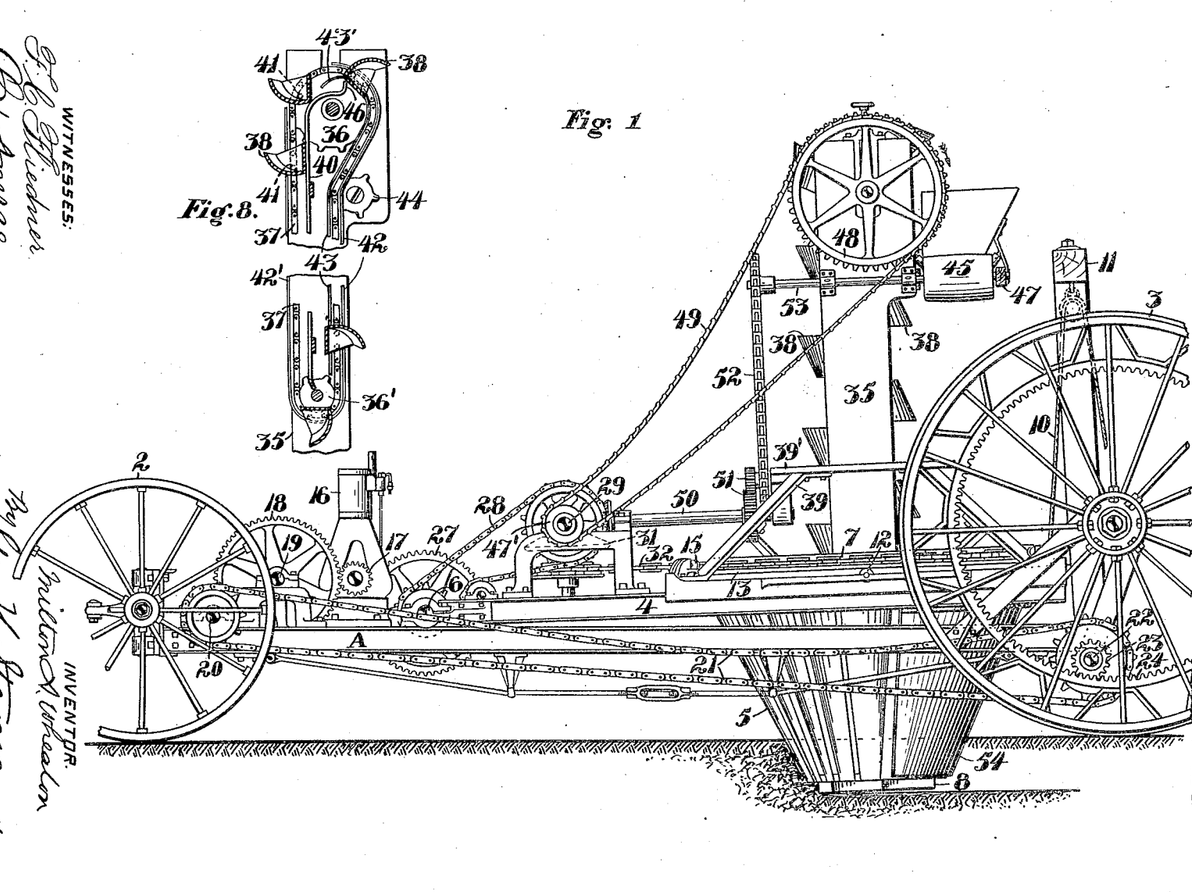
Figure 1 is a side elevation of the machine complete, portions of the end wheels being broken away and the basket-platform being slightly lifted from the main vehicle-frame.
Fig. 8 is a vertical section of the elevator, showing arrangement of guides and buckets.
Figure 7:
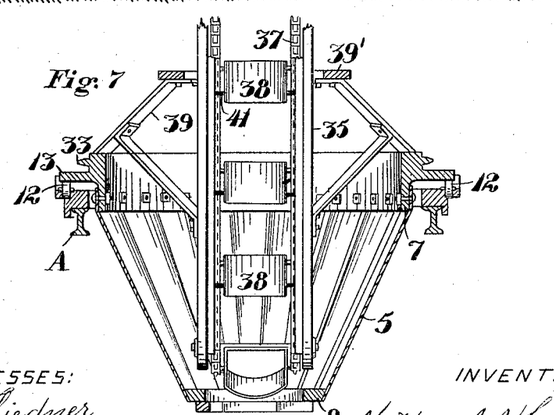
Fig. 7 is a vertical sectional view of the ditching-basket with its supporting-idlers and frame and showing the lower portion of the loose-earth elevator with its fastenings.

The hinged platform 4, immediately supporting the basket, is adapted to be raised and lowered to reciprocate the basket by any suitable means—as, for instance, the blocks and tackles 10, suspended from the gallows 11 on frame A. The purpose of this raising and lowering platform is to enable the cutting-basket to be lowered to any desired depth into the ground, dependent on the size and depth of ditch it is desired to dig, and for the basket to be lifted clear of the ground when the machine is to be moved from one place to another without doing any digging. The basket is supported on a platform 5 by means of the rollers 12, Figs. 1 and 7, disposed beneath the annular flange 13 of ring 7, and the adjustable rollers 14, which bear horizontally against the perimeter of the flange 13 to maintain the basket always with its axis in the same position relative to the platform. A third set of rollers 15 bear on top of the flange to prevent the basket being lifted out of its bearings when working. The several rollers are all suitably journaled in parts fast to the platform.

Any suitable means may be employed to propel the machine and operate the basket. In the present case I have illustrated an engine 16, supported on the frame A at the forward end of the machine. The engine-shaft carries a pinion 17, engaging a gear 18 on a shaft 19, from which motion is transmitted in either direction to the sprocket-shaft 20 and thence by a chain or chains 21 to a counter-shaft 22, having the pinions 23, meshing the internal gears 24 on the rear drive-wheels 3. The front wheels 2 are operated from the steering-wheel 25 by suitable mechanism well known in the art. The engine-shaft also carries a pinion 26, engaging a gear 27 on the pivot-shaft 6, from which latter a sprocket-chain 28 extends to a counter-shaft 29, journaled on platform 4. Shaft 29 carries a beveled gear 30, engaging a similar gear 31, fast to the shaft of a sprocket, around which passes a chain 32, which encircles the sprocket 33 on ring 7 to revolve the basket. Thus it is seen that the machine and the basket have a coördinate movement—that is, the rapidity of rotation of the basket is always relative to the speed of travel of the machine. If the machine goes faster, the basket will necessarily revolve faster to cut properly, and if the machine goes slower the basket will revolve more slowly. Furthermore, the pivoting of the frame on shaft 6 and the arrangement of the driving connections, as explained, enables the basket to be driven at various points in the arc of movement of the platform, which is essential where it is desired to dig ditches of different depth or a ditch of variable depth. A suitable clutch 34 of common construction may be employed to permit the basket-driving means to be thrown out and let the machine move as a motor-vehicle without having the basket revolve.

Any suitable form of conveying means may be employed to remove the loosened earth from the basket, the main object of the basket being to so loosen up and gather the excavated matter as to enable the latter to be handled without sticking to or clogging the conveying means.

Heretofore various forms of ditching-machines have been tried for working in boggy heavy soil or stiff mud, but the difficulty has been where the same instrumentalities were used to carry the earth away and dump it as were used to excavate it or gouge it out of the bank that in many instances it was almost impossible to detach the load because of its adhesion and cohesion and of its packing so tight into the scoops or baskets, it not infrequently requiring the stopping of the machine and the digging out of the compacted mass by means of shovels and crowbars.

The operation of the present machine so far as described is readily understood. The basket being set in motion and lowered to the proper depth and the machine moved over the ground, the soft loosened earth and soil taken into the basket is conveyed thence and deposited alongside the ditch in the form of a dike or levee by the following independent means: Rigidly supported on the platform and partaking of the same vertical adjustment as the latter are a pair of elevator-legs 35 35, having their lower ends or foot portion extending nearly to the bottom of the basket and their upper ends extending to any convenient height. These legs support the respective upper and lower large and small sprockets 36 36', around which pass chains 37, to which are pivoted the buckets 38. The support for the elevator-legs is shown by the four braces 39 and the annular frame-piece 39', fixed to the braces, and which are arranged out of all possible interference with the rotative movement of the ring 7 and the basket. The shafts of sprockets 36 36' are set at right angles to the line of draft, so that the buckets operate in a plane parallel with the direction of draft. The buckets have each preferably a straight vertical back portion which travels upon a vertical guide 40, rigid on the legs and adapted to prevent the loaded bucket swinging on its pivots. The front and bottom of the bucket, viewed from the inside, are concaved both transversely and lengthwise of the bucket, so that the bucket may conform more or less in its arc about the lower sprockets 36' to the contracted form of the basket and so more nearly occupy the entire space in the bottom of the basket during the loading period. The buckets are preferably arranged to operate in scooping up their loads toward the front of the machine rather than transverse to the line of draft, for the reason that they thus take up the earth as soon as it is cut and the uncut embankment ahead acts as a brace for the knives against the scooping action of the buckets. At the same time the buckets may be worked successfully crosswise of the machine. The ends of the buckets near their lower edges are provided with pins 41, which for a part of the circuit of the buckets travel in outer and inner guides 42 43 for the purpose of directing and holding the buckets during their dumping and subsequent filling operations. The chains after passing over the upper larger sprockets 36 are directed by the idle sprockets 44 underneath sprockets 36 to allow discharge from the buckets to take place and to avoid the horizontal conveyer 45, which receives the discharge and deposits it on the bank. The outer guides 42 extend around beneath the lower smaller sprockets 36' and up the front as a continuation 42'. The loaded bucket in its ascent is supported against the vertical guide 40. The dump is occasioned during the horizontal movement of the bucket across the top, when the links supporting the bucket pass over sprockets 36 by reason of the engagement of the bottom of the bucket with the rigid stop 46 or the engagement of the pins 41 with the downwardly and rather sharply inclined upper ends 43' of the inner guides 43, either or both acting to cause the bucket to turn upside down on its pivots with a sudden abrupt movement to free itself of its more or less sticky contents. From that point the guides 43 converge toward and then run parallel with the outer guides 42 to hold the bucket upside down and to insure its gathering up its load at the bottom as it passes around the shaft of sprockets 36'. Guide 40 is here shown as slightly curved in at the bottom consistent with the arc described by the buckets at that point and terminates at the shaft of the sprockets 36'. The horizontal discharge-conveyer 45 is represented as of the trough variety. It is suitably supported in a frame 47, carried by and movable with the platform 5 and driven in unison with the elevator and buckets and from the same source of power operating those parts. The connections to drive the elevator comprise a sprocket 47' on shaft 29, a sprocket 48 on the shafts of the sprockets 36, and a connecting-chain 49. The horizontal conveyer 45 is driven from bevel-gear 31 by means of a similar gear on a shaft 50, interengaging gears 51, sprocket-chain 52, and shaft 53 of an end supporting-roller of the conveyer.

The machine as thus described is especially adapted for reclamation purposes, the digging of drainage and irrigating ditches, the building of dikes and levees, and work of a like character. The cutters of the basket gather all the material into the basket, and the elevator removes it as fast as the basket receives it. The knives cannot clog, because the very act of cutting maintains them clean, and the independent elevator-buckets are enabled, by means of the preliminary cutting and loosening by the basket, to operate uninterruptedly even in very sticky soil, whereas if they attempted to gouge the same load out of the solid bank they would pack so tight as to render them inoperative a considerable part of the time. In order that none of the contents of the basket be deposited behind it in the finished ditch, there is provided a segmental shield 54, suitably supported on the platform concentric with and in close proximity to the basket and extending practically from bank to bank. The function of this shield is to retain the loose lighter portions of earth and other things that might sift through the knife-interspaces of the basket and by holding this sifted material against the basket causing it to be carried around against the bank and again into the basket.

The machine cuts a ditch with smooth clean sides and bottom, which for irrigating and drainage purposes is important, since such a ditch offers less resistance to the flow of water. The machine slopes the banks, making a more durable ditch, and it builds a compacted levee with the droppings from the conveyer parallel with the ditch.

While I have spoken generally of the cutting device as a "basket" because of its containing qualities and functions, I desire to have it understood that by the expression "rotating basket" or "rotative basket-cutter" or "rotating cutting-basket" I include, broadly, any equivalent form of combined rotary excavator and container or combined rotary cutter and receiving vessel, and it is the combination of such a rotary cutter-container and separate conveying or discharging means therefor that I desire most especially to protect by these Letters Patent.

It is manifest that the herein-described construction is capable of various changes and modifications without departing from the principle of the invention, and I do not wish to be understood as limiting myself beyond the requirements of the prior art and the reasonable construction of my claims.

Figure 9:
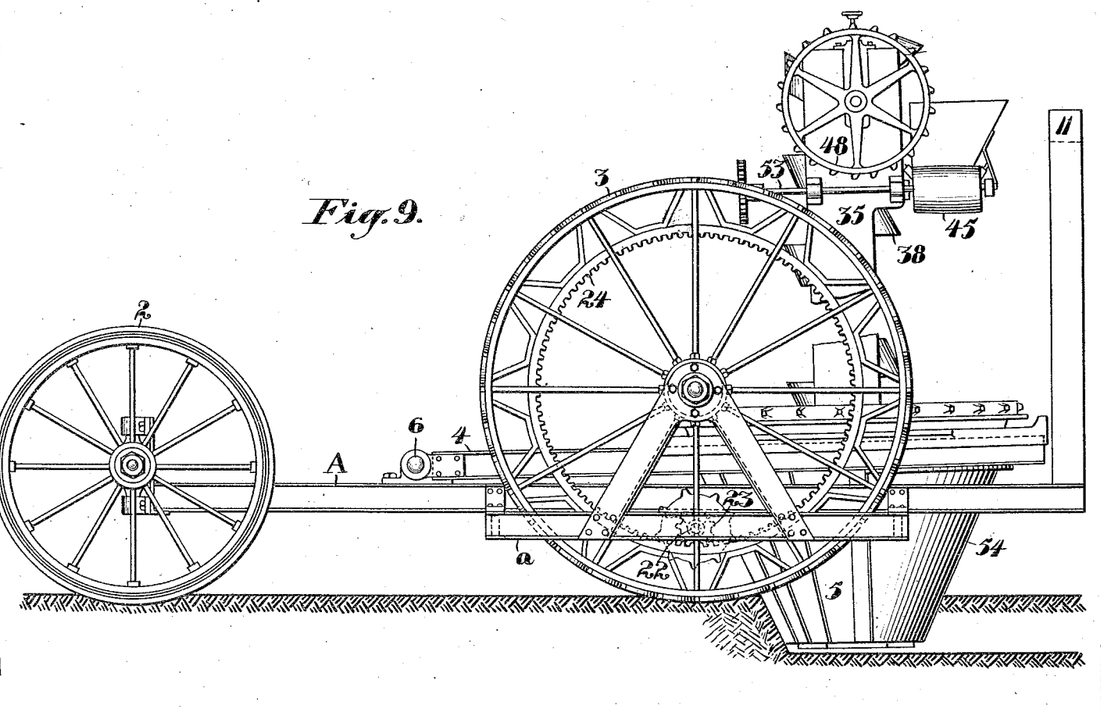
Fig. 9 is a side elevation of a modification of my machine, omitting driving mechanism.
Figure 10:
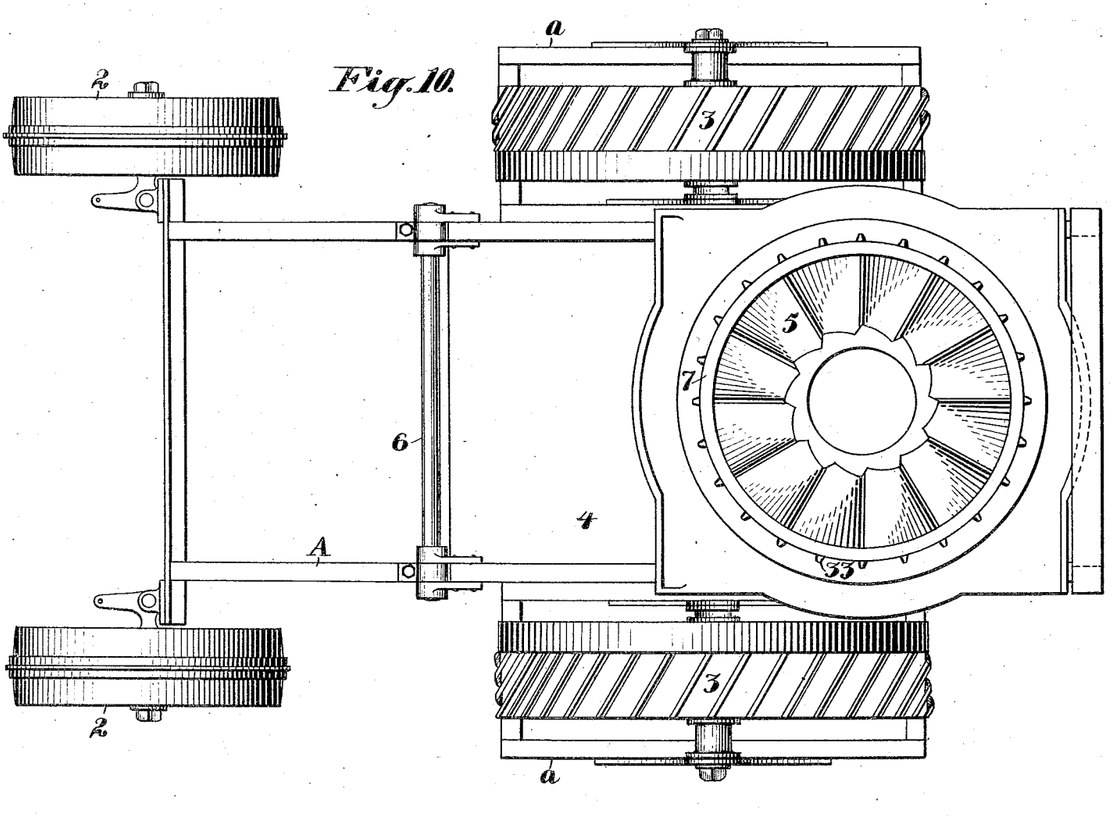
Fig. 10 is a plan view of same, omitting also the elevator.

In Figs. 9 and 10 I have shown a modification of my apparatus in which the rear wheels are mounted immediately forward instead of behind the basket. With the basket hung between the front and rear wheels there is danger at times, particularly with a heavy machine working in soft or loose soil and digging a wide deep ditch, of the hind wheels caving in the banks of the freshly-excavated trench. It is for this reason that the construction of Figs. 9 and 10 may be preferred. In this case the frame will be so proportioned and the engine-driving connections and various other parts so disposed as not to jeopardize in any way the equilibrium and stability of the machine. At the same time there will always be an unbroken area between the wheels to support them, with no possibility of their injury to the trench-walls, however heavy the machine or how wide the trench. In order better to support the frame and do away with a long heavy axle, the rear wheels may be provided with short axles suitably journaled in the outriggers $a$, as shown.

Figure 11:
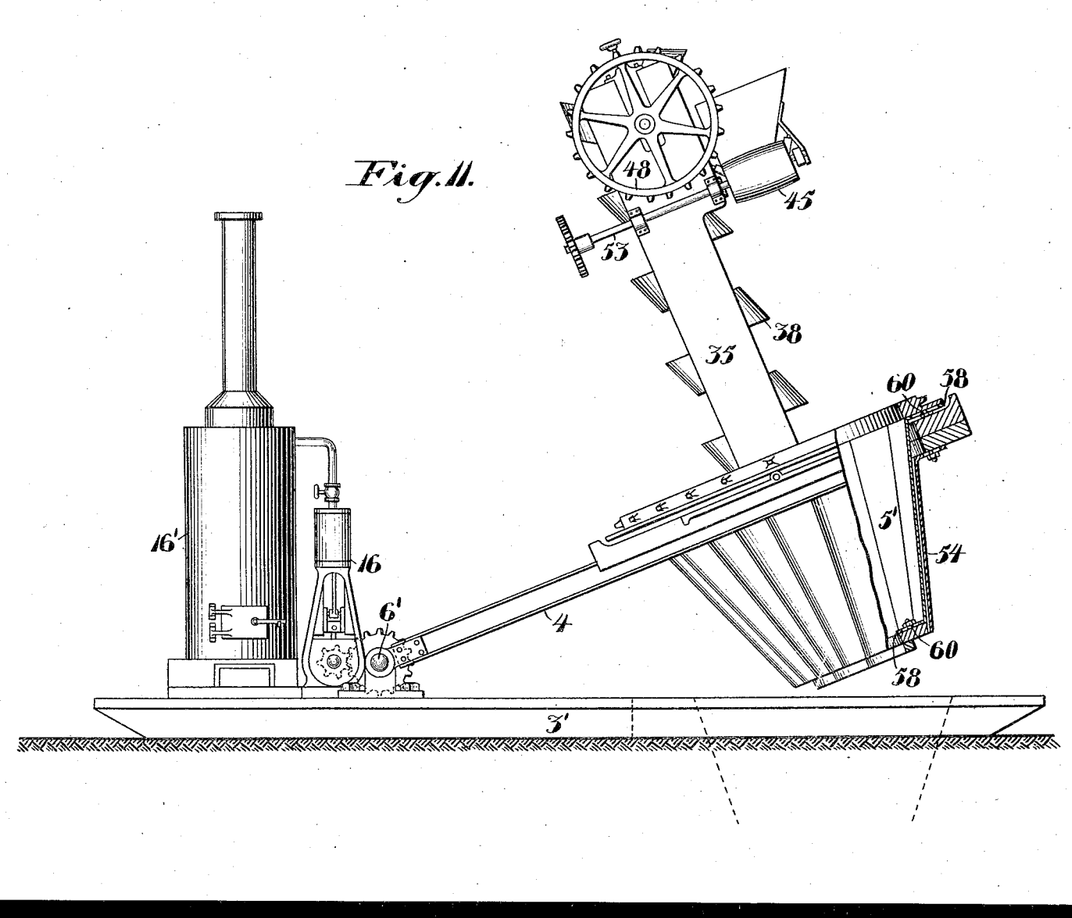
Fig. 11 is a side elevation of a modified form of ditching-machine, omitting certain parts.
Figures 12, 13, 14, 15:
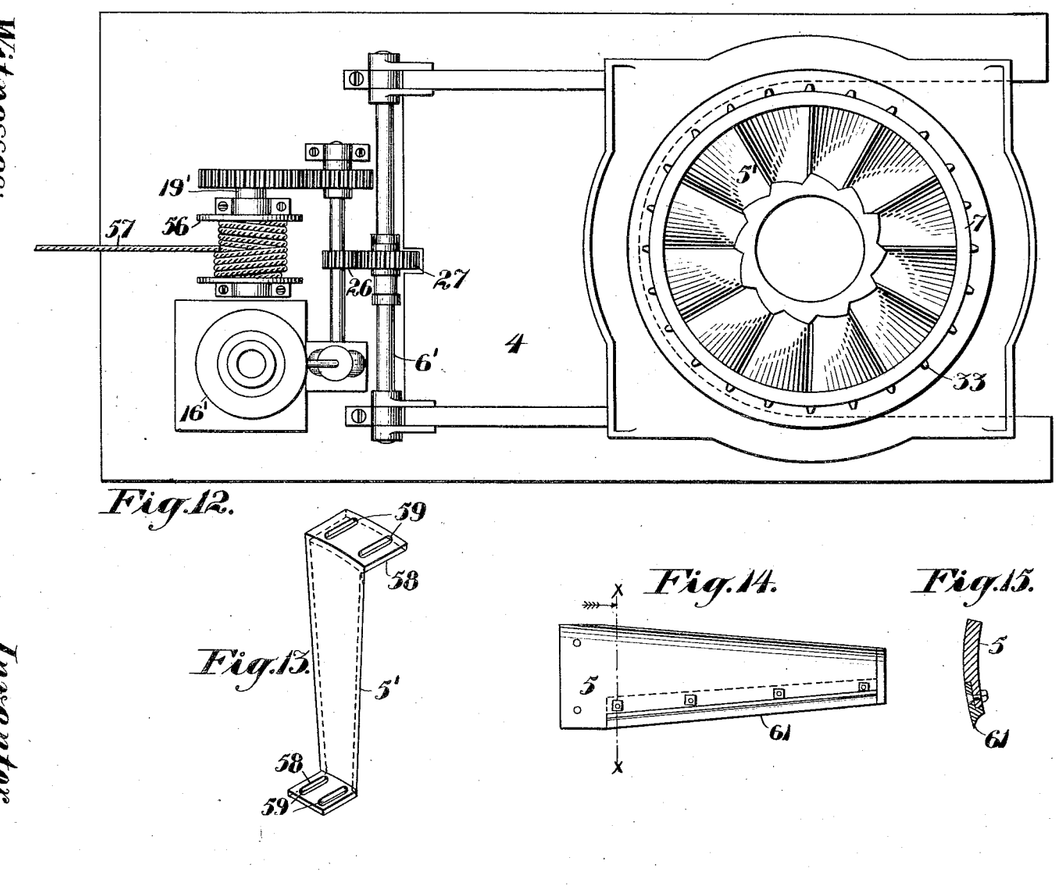
Fig. 12 is a plan view of same.
Figs. 13, 14, 15, are details of a knife-blade, Fig. 15 being on line *x x* of Fig. 14.

For work on very soft ground or on mud bottoms the machine may be mounted on suitable skids or runners 3', as shown in Figs. 11 and 12, and moved along by suitable draft means in the line of the excavation to be made.

Figure 2:
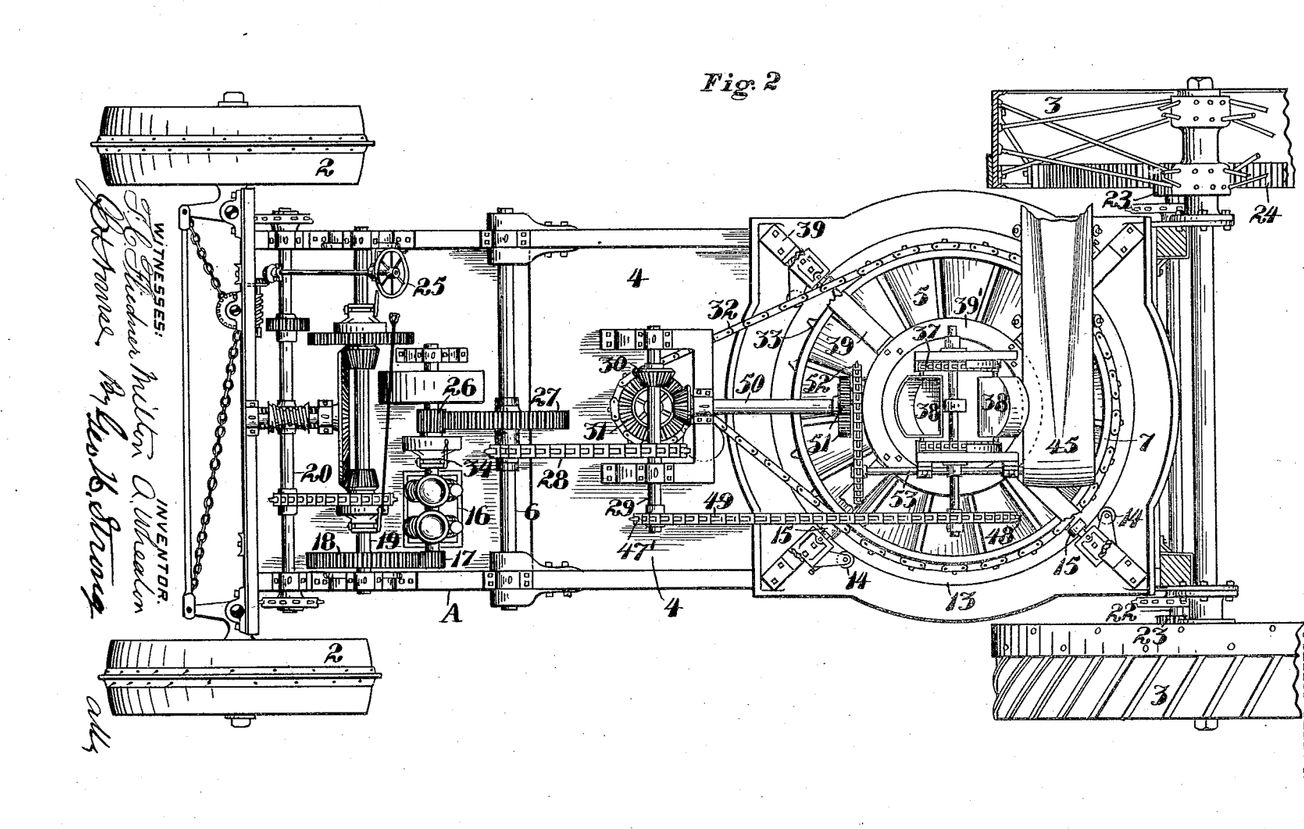
Fig. 2 is a plan view of the same with a sectional view of one of the propelling-wheels.
Figure 3:
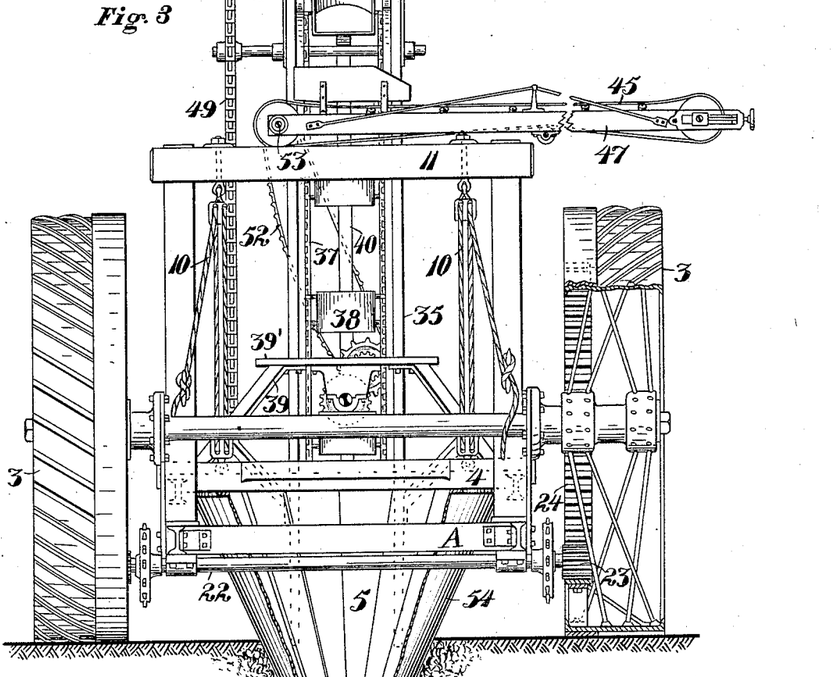
Fig. 3 is a rear end elevation of the machine with a partial sectional view of one of the propelling-wheels to disclose its internal gear and pinion meshing therein.
Figure 4:
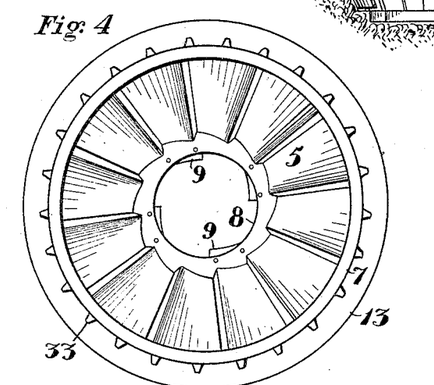
Fig. 4 is a plan of the ditching-basket looking from the top, showing the sprocket and inner view of the knives and cutter.
Figure 5:
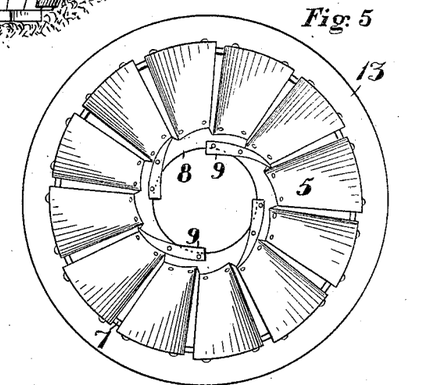
Fig. 5 is a plan or bottom view of the basket of Fig. 4.
Figure 6:
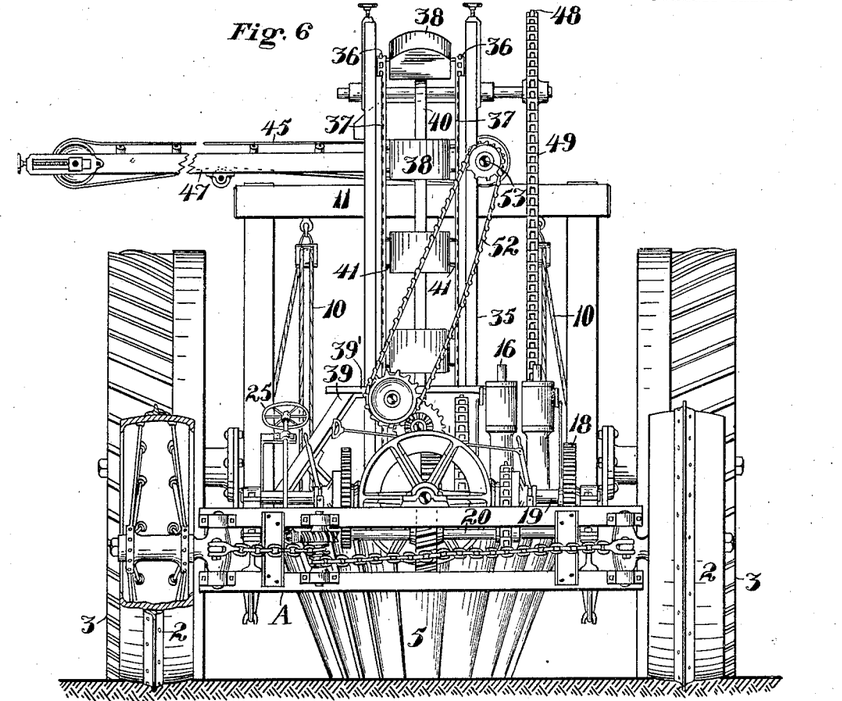
Fig. 6 is a front elevation of the machine.

A convenient and common method of moving a heavy body slowly over the ground is to anchor a line some distance ahead and then by a steam winch, windlass, or capstan gradually warp the body forward. In the present instance I have shown, Figs. 11 and 12, a drum 56 on a shaft 19' driven from the engine 16', from which drum a cable 57 runs ahead to a suitable anchor or fixed point of attachment. This drum is operated in unison with shaft 6', whence power to rotate the basket 5' is transmitted, so that the cable is wound up to propel the machine relative to the speed of the basket. It is understood that the basket and elevator are operated in substantially the same manner as described in conjunction with Figs. 1 and 2, and hence the specific connections are not here shown nor further described.

In Figs. 11 to 13 I have also shown a modified form of the basket wherein the blades are made adjustable radially of the basket to increase or decrease the size of the same according as a wider or narrower ditch is wanted. In this case the blades have upper and lower horizontal or substantially horizontal flanges 58, which are slotted, as at 59, and are adapted to be bolted to the respective under and top sides of the rings 7 8. By slackening up the bolts 60 the blades may be moved in or out radially of the rings to bring the cutting edges of the knives nearer to or farther from the axis of the basket and the bolts then tightened, care being taken to preserve the proper spacing between the front edge of one blade and the rear edge of the succeeding one, so as to leave the necessary space or slot for the entry into the basket of the sliced-off matter.

If desired, the blades may be provided with removable and renewable cutting portions 61, as shown in Figs. 14 and 15, which will obviate the necessity for the entire dismantling of the basket in case one or more of the blades become dulled or worked unsatisfactorily. The use of the removable blade-sections 61 also permits the portions of the knives most subjected to wear to be made of tool-steel and tempered, while the main body of the knives may be of cheaper material.

Having thus described my invention, what I claim, and desire to secure by Letters Patent, is—

1. In a ditching-machine, the combination of a suitably-supported cutting-basket, means for rotating the basket, means for transporting the basket in a direction transverse to its axis of rotation and conveying means operating within the basket.

2. In a ditching-machine, the combination of a suitably-supported hollow cutting device comprising a plurality of circumferentially-arranged cutting-blades, with openings between the blades directing material into the interior of the cutter, means for rotating the cutter, means for moving it on lines transverse to its axis of rotation and conveyer means operating within the cutter.

3. In a ditching-machine, the combination with a portable support, of a hollow rotatable radially-adjustable cutter-basket normally operating below the plane of the support, means for moving the support on horizontal lines and means for rotating the cutter, said cutter having its axis substantially vertical.

4. In a ditching-machine, the combination with a portable support, a hollow rotatable cutter-basket normally operating below the plane of the support, means for moving the support, and means for rotating the cutter, and conveyer means operating within the cutter.

5. In a ditching-machine, the combination with a suitable rotatable support, a rotatable cutter-basket mounted thereon and normally operating below the plane thereof, means for propelling the support and means for rotating the cutter correlative with the rate of travel of the support.

6. In a ditching-machine, the combination with a suitably-supported hollow rotary basket having slotted sides and cutting edges proximate to the slots in the sides, means for rotating the cutter and means for moving the cutter in a direction transverse to its axis of rotation.

7. In a ditching-machine, the combination with a suitably-supported hollow rotary basket having slotted sides and cutting edges proximate to the slots in the sides, means for rotating the cutter and means for moving the cutter in a direction transverse to its axis of rotation and conveying means operating within the cutter.

8. In a ditching-machine, a cutting device comprising a plurality of circumferentially-arranged spaced knives having their cutting edges disposed in substantially vertical planes and suitable end supports for said knives.

9. In a ditching-machine, a cutting device comprising a hollow basket open at the ends and having a plurality of circumferentially-arranged spaced knives with cutting edges arranged in substantially vertical planes.

10. In a ditching-machine, a cutting device in the form of a hollow truncated cone rotatable about a vertical axis and having peripheral slots in planes approximately coincident with the axis of rotation of the device and cutting edges proximate to the slots.

11. In a ditching-machine, the combination with a suitable portable support of a hollow rotary cutting device carried by and normally pendent beneath the support, means for propelling the support, means for rotating the cutting device, conveyer means operating in the cutting device, and means including a hinged platform for varying the depression of the cutting device relative to the plane of the support.

12. In a ditching-machine, the combination of a portable frame, of a rotatable radially-adjustable cutting device carried thereby, and operatable beneath the frame, means for propelling the latter, means for operating the cutting device and conveyer means associated with the cutting device.

13. In a ditching-machine, the combination of a portable frame, of a cutting device carried thereby and operatable beneath the frame, conveyer means operating in the cutting device, means for propelling the frame and means for operating the cutting device coördinately with the rate of travel of the frame.

14. In a ditching-machine, the combination of a portable frame, a rotary cutting-basket carried by and operatable below the frame, said basket comprising a series of circumferentially-spaced adjustable knives with their cutting edges lying approximately in vertical planes, means for rotating the basket and means for discharging it.

15. In a ditching-machine, a portable frame, a radially-expansible rotary, cutting-basket carried thereby, means for rotating the basket, a conveyer operating in the basket, and means for effecting the radial expansion or contraction of the basket.

16. In a ditching-machine, a rotary cutting-basket, a suitable support for the basket, said basket composed of a series of circumferentially-arranged, spaced, radially-adjustable knives, means for rotating the same and means for moving it on lines transverse to its axis of rotation.

17. In a ditching-machine, a combined rotary cutter and container, a suitable support for the container, means for rotating the same and means for moving it on lines transverse to its axis of rotation, and conveying means associated with the container.

18. In a ditching-machine, a combined rotary cutter and container, a suitable support for the container, means for rotating the same and means for moving it on lines transverse to its axis of rotation and conveying means operating within the container.

19. In an excavating apparatus, the combination of a suitable support, a radially-expansible rotary cutter and container, means for rotating the container and means for delivering the contents of the container at a point exterior thereto.

20. In an excavating apparatus, the combination with a suitable support of a combined rotary cutter and container comprising a plurality of circumferentially-arranged spaced knives inclined relative to the axis of rotation of the container, means for rotating the same and means for discharging the contents of the container.

21. In an excavating apparatus, the combination with a suitable support of a combined rotary cutter and container comprising a plurality of circumferentially-arranged spaced knives inclined relative to the axis of rotation of the container, means for rotating the same and means for discharging the contents of the container, said last-named means including a conveyer operating in the container.

22. In an excavating apparatus, the combination with a suitable support of a combined rotary cutter and container comprising a plurality of circumferentially-arranged spaced knives inclined relative to the axis of rotation of the container, means for rotating the same and means for discharging the contents of the container, said last-named means including an elevator operating in the container and means for giving the elevator and the container a coördinate movement.

23. In an excavating apparatus, a portable support, a combined rotary cutter and container mounted thereon, delivery means operating in the container, means for propelling the support, means for rotating the conveyer and means for operating the delivery means.

24. In an excavating apparatus, a wheeled support, a combined rotary cutter and container mounted thereon, delivery means operating in the container and means for giving a coördinate movement to the support, the container and the delivery means.

25. In excavating apparatus, a portable frame, a cutting device comprising a combined rotary cutter and container carried by and normally operatable below the frame, said cutting device having its axis of rotation transverse to the line of draft and conveying means operating in said device.

26. In excavating apparatus, a portable frame, a hinged platform, a cutting device mounted thereon and comprising a combined rotary cutter and container, said cutting device having its axis of rotation transverse to the line of draft, and means for reciprocating the cutting device transversely of the plane of the frame and conveying means operatably associated with the cutting device.

27. In excavating apparatus, a portable frame, means for propelling the same, a radially-adjustable rotary cutting device comprising a combined cutter and container mounted on said frame, said cutting device having its axis of rotation transverse to the line of draft, and means for operating said cutting device at various levels according to the desired depth of the excavation.

28. In excavating apparatus, a portable frame, means for propelling the same, a rotary cutting device comprising a combined cutter and container mounted on said frame, said cutting device having its axis of rotation transverse to the line of draft, means for operating said cutting device at various levels according to the desired depth of the excavation, and conveying means operating within said cutting device.

29. In excavating apparatus, a portable frame, means for propelling the same, a rotary cutting device comprising a combined cutter and container mounted on said frame, said cutting device having its axis of rotation transverse to the line of draft, means for operating said cutting device at various levels according to the desired depth of the excavation, conveying means operating within said cutting device and means for giving said cutting device and said conveying means a coordinate movement.

30. In excavating apparatus, a portable frame, means for propelling the same, a rotary cutting device comprising a combined cutter and container mounted on said frame, said cutting device having its axis of rotation transverse to the line of draft, means for operating said cutting device at various levels according to the desired depth of the excavation, conveying means operating within said cutting device, and means for rotating the cutting device coördinately with the rate of travel of the machine.

31. In excavating apparatus, a portable frame, a radially-adjustable rotary cutting-basket mounted thereon having its axis of rotation transverse to the line of draft, means for propelling the frame and means for rotating the basket.

32. In excavating apparatus, a portable frame, a vertically-adjustable rotary cutting-basket mounted thereon having its axis of rotation transverse to the line of draft, means for propelling the frame, means for rotating the basket coördinately with the rate of travel of the machine and a conveyer operating within the basket.

33. In excavating apparatus, a portable frame, a vertically-adjustable rotary cutting-basket mounted thereon having its axis of rotation transverse to the line of draft, means for propelling the frame, means for rotating the basket coördinately with the rate of travel of the machine and a conveyer operating within the basket and adjustable vertically in unison with the basket.

34. In excavating apparatus, a portable frame, a vertically-adjustable cutting-basket mounted thereon and having its axis of rotation transverse to the line of draft, means for effecting the vertical adjustment of said basket, means for propelling the frame, means for rotating the basket, a conveyer operating in and adjustable vertically in unison with the basket and means for operating the conveyer in unison with the rotative movement of the basket.

35. In excavating apparatus, a portable frame, a hinged platform thereon, a rotary hollow cutting device carried by said platform and having its axis of rotation transverse to the line of draft, means for turning the platform on its hinges to vary the level of the cutting device, means for propelling the frame and means for rotating the cutting device.

36. In excavating apparatus, a portable frame, a hinged platform thereon, a rotary hollow cutting device carried by said platform and having its axis of rotation transverse to the line of draft, means for turning the platform on its hinges to vary the level of the cutting device, means for propelling the frame, means for rotating the cutting device, and conveying means associated with the cutting device and having a movement coordinate therewith.

37. In excavating apparatus, a portable frame, a hinged platform thereon, a rotary hollow cutting device carried by said platform and having its axis of rotation transverse to the line of draft, means for turning the platform on its hinges to vary the level of the cutting device, means for propelling the frame and means for rotating the cutting device coördinately with the rate of travel of the machine.

38. In excavating apparatus, a portable frame, a hinged platform thereon, a rotary hollow cutting device carried by said platform and having its axis of rotation transverse to the line of draft, means for turning the platform on its hinges to vary the level of the cutting device, means for propelling the frame and means for rotating the cutting device at various points in the arc of movement of the platform about its hinges.

39. In excavating apparatus, a portable frame, a hinged platform thereon, a rotary cutting-basket supported on said platform and normally operatable below the frame, means for propelling the latter, and means for rotating the basket.

40. In excavating apparatus, a portable frame, a hinged platform thereon, a rotary cutting-basket supported on said platform and normally operatable below the frame, means for propelling the latter, and means for rotating the basket coördinate with the rate of travel of the machine.

41. In excavating apparatus, a portable frame, a hinged platform thereon, a rotary cutting-basket supported on said platform and normally operatable below the frame, means for propelling the latter, and means for rotating the basket coördinate with the rate of travel of the machine and an elevator supported by the platform and operatable within the basket.

42. In excavating apparatus, a portable frame, a hinged platform thereon, a rotary cutting-basket supported on said platform and normally operatable below the frame, means for propelling the latter, and means for rotating the basket coördinate with the rate of travel of the machine and an elevator supported by the platform and operatable within the basket and a lateral conveyer arranged to receive the discharge from the elevator and means for operating the elevator and said lateral conveyer in unison.

43. In excavating apparatus, a portable frame, a hinged platform thereon, a rotary cutting-basket supported on said platform and normally operatable below the frame, means for propelling the latter, means for rotating the basket coördinate with the rate of travel of the machine, an elevator supported by the platform and operatable within the basket, a lateral conveyer arranged to receive the discharge from the elevator, and means for operating the basket, the elevator and the lateral conveyer in unison.

44. In excavating apparatus, the combination with a suitably-supported rotatable hollow cutter, of an elevator operating in said cutter, means for giving the cutter and the elevator a coördinate movement, means to move the cutter horizontally during its rotation and means by which the cutter is revolved at corresponding speed with its horizontal movement.

45. In excavating apparatus, the combination with a suitably-supported rotary cutting device comprising a combined cutter and container rotatable about a vertical axis, of means for rotating the cutting device, an elevator operatable in said device, means to move the cutter horizontally during its rotation and means by which the cutter is revolved at corresponding speed with its horizontal movement.

46. In an excavating apparatus, the combination with a suitably-supported, vertically-adjustable rotary cutting device comprising a combined cutter and container rotatable about a vertical axis, of means for rotating the cutting device means for effecting the vertical adjustment of said cutting device, conveying means operatable within the cutting device, means to move the cutter horizontally during its rotation and means by which the cutter is revolved at corresponding speed with its horizontal movement.

47. In an excavating apparatus, the combination with a suitably-supported, vertically-adjustable rotary cutting device comprising a combined cutter and container rotatable about a vertical axis, of means for rotating the cutting device means for effecting the vertical adjustment of said cutting device and conveying means operatable within the cutting device, said last-named means comprising an elevator adjustable vertically with the cutting device, and means for operating the elevator and cutting device in unison.

48. In excavating apparatus, the combination with a suitably-supported rotary cutting-basket, of an elevator operating in said basket, said elevator comprising an endless carrier, buckets pivotally suspended from said carrier, means for operating the carrier, means for maintaining the buckets upright in their upward travel, means in the path of the buckets to effect their inversion to discharge their contents and means for maintaining them in inverted position during their downward travel and while receiving their load.

49. In excavating apparatus, the combination with a hollow rotary cutting-basket of an elevator comprising a series of buckets pivotally suspended at their ends on suitable flexible endless connections, said buckets having a vertical rear portion, a vertical guide on the elevator-frame with which the vertical portion of said buckets engages during a part of their travel, stop means in the path of the buckets to effect their inversion and guide means to maintain the inversion of the buckets during a portion of their travel.

50. In excavating apparatus, the combination with a rotary cutting basket or container of an elevator operating in said basket, said elevator comprising a suitable frame, upper and lower sprockets journaled in said frame, chains passing over said sprockets, buckets pivotally suspended at their ends from said chains, guides on the frame engageable by the buckets to maintain them upright in one plane of their travel and to hold them in inverted position during the other plane of their travel and stop means at the top of the elevator in the path of the buckets to effect the dump.

51. In excavating apparatus, the combination with a cutting-basket of an elevator operating therein, said elevator comprising a suitable frame, upper and lower sprockets journaled in said frame, endless carriers passing over said sprockets, said upper sprockets of larger diameter than the lower sprockets, idle sprockets directing a plane of the carriers in under the upper sprockets, buckets pivotally suspended from said carriers, said buckets having a straight back portion, a vertical guide on the elevator-frame engaging said straight portion to maintain the buckets upright, rigid stop means in the path of the buckets to effect the dump, curved guides on the frame and parts on the buckets engaging said guides to hold the buckets in inverted position preliminary to receiving a load.

52. In a ditching-machine, the combination with a movable support, of a rotary basket thereon, means for rotating the basket, an elevator operating in the basket, said elevator comprising an endless carrier mounted on sprockets having their axes transverse to the line of draft, buckets carried by said carrier, and means for operating the buckets to gather their load in the direction of draft.

53. In a ditching-machine, the combination with a movable support, of a rotatable basket mounted thereon and having its axis of rotation approximately at right angles to the line of draft, means for rotating the basket and a segmental shield proximate to and rearward of the basket.

54. In a ditching-machine, the combination with a movable support, of a rotatable basket mounted thereon and having its axis of rotation approximately at right angles to the line of draft, means for rotating the basket and a segmental shield proximate to and rearward of the basket and conveyer means operating in the basket.

55. In a ditching-machine, the combination with a movable support, of a rotatable basket mounted thereon and having its axis of rotation approximately at right angles to the line of draft, means for rotating the basket and a segmental shield proximate to and rearward of the basket and conveyer means operating in the basket, said conveyer means comprising an elevator having a series of buckets operating in a plane of the line of draft.

56. In a ditching-machine, the combination with a movable support, of a rotatable cutting-basket thereon having its axis of rotation transverse to the line of draft, means for propelling the support and means for rotating the basket, and a segmental shield concentric with and proximate to that portion of the basket not engaged in cutting and arranged to prevent material from the basket falling back into the ditch.

57. In a ditching-machine, the combination with a movable support and propelling means therefor, of a vertically-reciprocal rotatable radially-adjustable cutting-basket thereon having its axis of rotation approximately at right angles to the line of draft, means for rotating the basket, and means for effecting the vertical reciprocation of the basket.

58. In a ditching-machine, the combination with a movable support and propelling means therefor, of a vertically-reciprocal rotatable, cutting-basket thereon having its axis of rotation approximately at right angles to the line of draft means for rotating the basket coördinately with the rate of travel of the machine, means for effecting the vertical reciprocation of the basket, and a segmental shield concentric with and proximate to the basket.

59. In a ditching-machine, the combination with a movable support and propelling means therefor, of a vertically-reciprocal rotatable, cutting-basket therein having its axis of rotation approximately at right angles to the line of draft, means for rotating the basket coördinately with the rate of travel of the machine, means for effecting the vertical adjustment of the basket, and a segmental shield concentric with and proximate to the basket and stationary relative to the rotative movement of the basket.

60. In a ditching-machine, the combination with a movable support and propelling means therefor, of a vertically-reciprocal rotatable, cutting-basket therein having its axis of rotation approximately at right angles to the line of draft, means for rotating the basket coördinately with the rate of travel of the machine, means for effecting the vertical adjustment of the basket, and a segmental shield concentric with and proximate to the basket, stationary relative to the rotative movement of the basket and adjustable vertically in unison with the basket.

61. In a ditching-machine, the combination with a portable support, of a hollow rotatable cutter normally operating below the plane of the support, means for moving the support on horizontal lines and means for rotating the cutter, said cutter having its axis substantially vertical and a segmental shield concentric with and rearward of the cutter.

62. In excavating apparatus, a movable frame, a rotary cutting device comprising a combined cutter and container mounted thereon and having its axis of rotation transverse to the line of draft, means for maintaining the cutting device at various levels, means for operating the cutting device coördinately with the rate of travel of the machine and a segmental shield concentric with and rearward of the cutting device and adjustable at various levels in unison with said cutting device.

63. In excavating apparatus, a movable frame, a hinged platform thereon, a rotary hollow cutting device carried by said platform and having its axis of rotation transverse to the line of draft, means for turning the platform on its hinges to vary the level of the cutting device, means for propelling the frame, means for rotating the cutting device and a segmental shield substantially concentric with, proximate to and rearward of the cutting device, carried by the platform.

64. In a ditching-machine, the combination of a frame mounted on wheels, a rotary cutting-basket carried by said frame and having its axis of rotation transverse to the line of draft, said basket disposed rearward of the hind wheels of the machine, and means for rotating the basket.

65. In a ditching-machine, the combination of a frame mounted on wheels, a rotary cutting-basket carried by said frame and having its axis of rotation transverse to the line of draft, said basket disposed rearward of the hind wheels of the machine, means for rotating the basket and carrying means operating within the basket.

66. In a ditching-machine, the combination of a frame mounted on wheels, a rotary cutting-basket carried by said frame and having its axis of rotation transverse to the line of draft, said basket disposed rearward of the hind wheels of the machine, means for rotating the basket and carrying means operating within the basket, and means for operating the conveying means and basket in unison.

67. In a ditching-machine, the combination of a frame mounted on wheels, a rotary cutting-basket carried by said frame and having its axis of rotation transverse to the line of draft, said basket disposed rearward of the hind wheels of the machine, means for rotating the basket, means on the frame for propelling the machine and means for operating the basket coördinately with the rate of travel of the machine.

68. In a ditching-machine, the combination of a frame mounted on wheels, a rotary cutting-basket carried by said frame and having its axis of rotation transverse to the line of draft, said basket disposed rearward of the hind wheels of the machine, means for rotating the basket, means on the frame for propelling the machine, means for operating the basket coördinately with the rate of travel of the machine and means for discharging the contents of the basket laterally of the direction of travel of the machine.

69. In a ditching-machine, a cutting device comprising a hollow basket open at the ends and having a plurality of circumferentially-arranged spaced knives with cutting edges arranged in substantially vertical planes, said knives being adjustable radially of the basket to vary the diameter of the latter.

70. In a ditching-machine, a cutting device in the form of a hollow truncated cone rotatable about a vertical axis and having peripheral slots in planes approximately coincident with the axis of rotation of the device, cutting edges proximate to the slots, and means for contracting or expanding said basket.

71. In a ditching-machine, a cutting device comprising a plurality of circumferentially-arranged spaced knives having their cutting edges disposed in substantially vertical planes and suitable end supports for said knives, said knives having flanged ends adjustable radially of said end supports.

72. In a ditching-machine, a cutting device comprising a plurality of circumferentially-arranged spaced knives having their cutting edges disposed in substantially vertical planes and suitable end supports for said knives, said knives having removable cutting portions.

In testimony whereof I have hereunto set my hand in presence of two subscribing witnesses.

MILTON A. WHEATON.

Witnesses:
S. H. NOURSE,
D. B. RICHARDS.